United States Patent
Krass et al.

(10) Patent No.: US 10,438,578 B1
(45) Date of Patent: Oct. 8, 2019

(54) ACTIVE SOUND CONTROL IN A LIGHTING SYSTEM

(71) Applicant: ABL IP HOLDING LLC, Conyers, GA (US)

(72) Inventors: Robert M. Krass, Ashburn, VA (US); David P. Ramer, Reston, VA (US); Gregory Malone, Herndon, VA (US); Rashmi Kumar Rogers, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/948,401

(22) Filed: Apr. 9, 2018

(51) Int. Cl.
*G10K 11/178* (2006.01)
*F21V 33/00* (2006.01)
*F21V 8/00* (2006.01)

(52) U.S. Cl.
CPC .... *G10K 11/17823* (2018.01); *F21V 33/0056* (2013.01); *G02B 6/0011* (2013.01); *G10K 2210/3011* (2013.01); *G10K 2210/3044* (2013.01)

(58) Field of Classification Search
CPC ..... G10K 11/17823; G10K 2210/3011; G10K 2210/3044; F21V 33/0056; G02B 6/011
See application file for complete search history.

(56) References Cited

U.S. PATENT DOCUMENTS

| | | | |
|---|---|---|---|
| 5,659,410 A * | 8/1997 | Koike | G02B 6/0046 349/62 |
| 8,780,673 B2 * | 7/2014 | Cohen | H02K 41/03 367/140 |
| 9,851,094 B2 | 12/2017 | Gommans | |
| 2001/0026626 A1 * | 10/2001 | Athanas | H04R 17/00 381/190 |
| 2007/0200467 A1 * | 8/2007 | Heydt | H04R 19/02 310/311 |
| 2009/0010477 A1 * | 1/2009 | Frobisher | F21V 33/0056 381/386 |

(Continued)

FOREIGN PATENT DOCUMENTS

| | | | |
|---|---|---|---|
| CN | 202125844 U | * | 1/2012 |
| KR | 20110073404 A | * | 6/2011 |

*Primary Examiner* — Davetta W Goins
*Assistant Examiner* — Kuassi A Ganmavo
(74) *Attorney, Agent, or Firm* — RatnerPrestia

(57) ABSTRACT

Disclosed herein is a lighting system including a luminaire having a lighting device and a sound reduction device. The lighting device includes an illumination output surface, which is at least partially reflective with respect to an audio wave from outside the luminaire. The lighting device also includes an illumination light source configured to generate illumination light for emission through the illumination output surface for illumination of an area. The sound reduction device includes a pick up microphone and an audio output source. The pick up microphone is configured to detect incoming audio waves in a vicinity of the luminaire. The lighting system further includes a circuitry including a sound reduction controller coupled to the pick up microphone and the audio output source of the sound reduction device. The sound reduction controller is configured to operate the audio output source to control sound at least in vicinity of the illuminated area associated with the incoming audio waves.

21 Claims, 12 Drawing Sheets

(56) References Cited

U.S. PATENT DOCUMENTS

| | | |
|---|---|---|
| 2011/0129096 A1 | 6/2011 | Raftery |
| 2011/0158420 A1* | 6/2011 | Hannah .................. H04R 1/105 |
| | | 381/71.6 |
| 2014/0140551 A1* | 5/2014 | Ramstein ............. H04R 17/005 |
| | | 381/182 |
| 2014/0270279 A1* | 9/2014 | Jones ....................... H04R 7/18 |
| | | 381/190 |
| 2018/0098139 A1* | 4/2018 | Arevalo Carreno ... H04R 31/00 |

\* cited by examiner

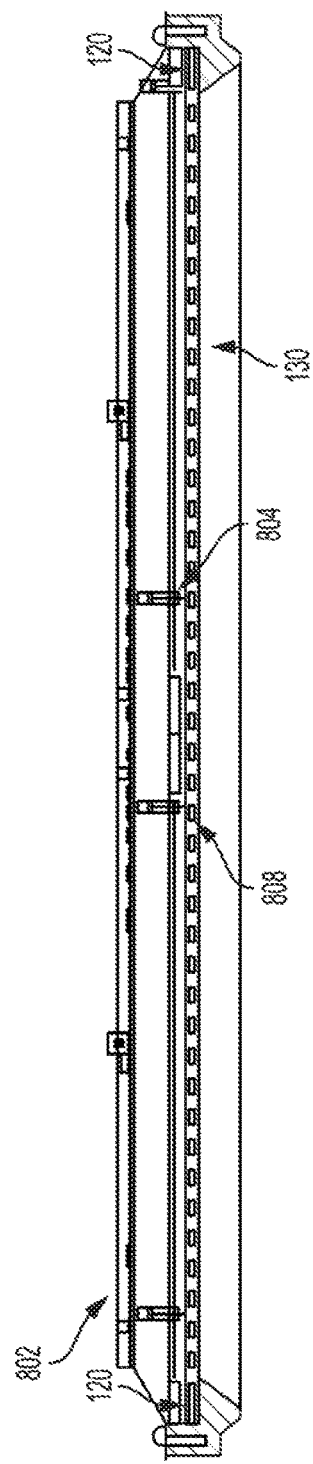

ACTIVE SOUND CONTROL IN A LIGHTING SYSTEM

TECHNICAL FIELD

The present subject matter relates to a lighting system, and/or operations thereof, where the lighting system includes a luminaire having a lighting device to illuminate an area and a sound reduction device configured to detect incoming sound in the vicinity of the luminaire, and more specifically, control strategies for use in such a luminaire to operate the sound reduction device to control sound in the illuminated area associated with incoming sound.

BACKGROUND

Electrically powered artificial lighting has become ubiquitous in modern society. Electrical lighting devices are commonly deployed, for example, in homes, buildings of commercial and other enterprise establishments, as well as in various outdoor settings. Typical luminaires generally have been a single purpose lighting device that includes a light source to provide artificial general illumination of a particular area or space.

Multiple lighting devices are often utilized to provide general illumination to an entire region, such as an entire floor of an office or commercial establishment. Traditionally, such lighting devices are distributed in a pattern across the ceiling of the region under illumination. These lighting devices may include broad, generally planar structures, such as optical diffusers, which reflect a large portion of any sound generated in the region under illumination. In installations with substantial space between the lighting devices, the intervening spaces often tend to deaden sound a reduce impact of sound reflection off of the planar structures of the lighting devices.

It is desirable to provide sound reducing capabilities in the illuminated area or space. Currently, there exists acoustic panels that are configured to reduce noise or control sound in many different spaces. However, lighting equipment for illumination and noise equipment for sound control have fundamentally different requirements, for example, for consumer applications. There have been proposals to embed acoustic panels with LEDs to light up the space. However, such proposals require making the light panels with acoustic material and placing the panels in specific directions with respect to one another in order to allow for acoustic absorption.

Thus there is a need for technical improvements in acoustic-illumination integrated device to control the sound.

SUMMARY

Hence, there is room for improvement to provide sound control capabilities in a lighting system. Examples of the lighting system include a luminaire including both the illumination device and acoustic device integrated in the luminaire, thus offering both illumination capabilities and sound control capabilities and systems that incorporate such luminaires.

In one example, the lighting system includes a luminaire, including a lighting device and a sound reduction device. The lighting device includes an illumination light output surface. The illumination light output surface is at least partially reflective with respect to an audio wave from outside the luminaire. The lighting device also includes a source of an illumination light configured to generate illumination light for emission through the illumination output surface for illumination of an area. The sound reduction device includes a pick up microphone configured to detect incoming audio waves in the vicinity of the luminaire. The sound reduction device also includes an audio output source. The lighting system further includes a circuitry coupled to the sound reduction device. The circuitry includes a sound reduction controller coupled to the pick up microphone and the audio output source. The sound reduction controller is configured to operate the audio output source to control sound at least in the illuminated area associated with the incoming audio waves.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 8B illustrates one implementation of cross-sectional view of the luminaire of FIG. 8A

DETAILED DESCRIPTION

Figure 1:
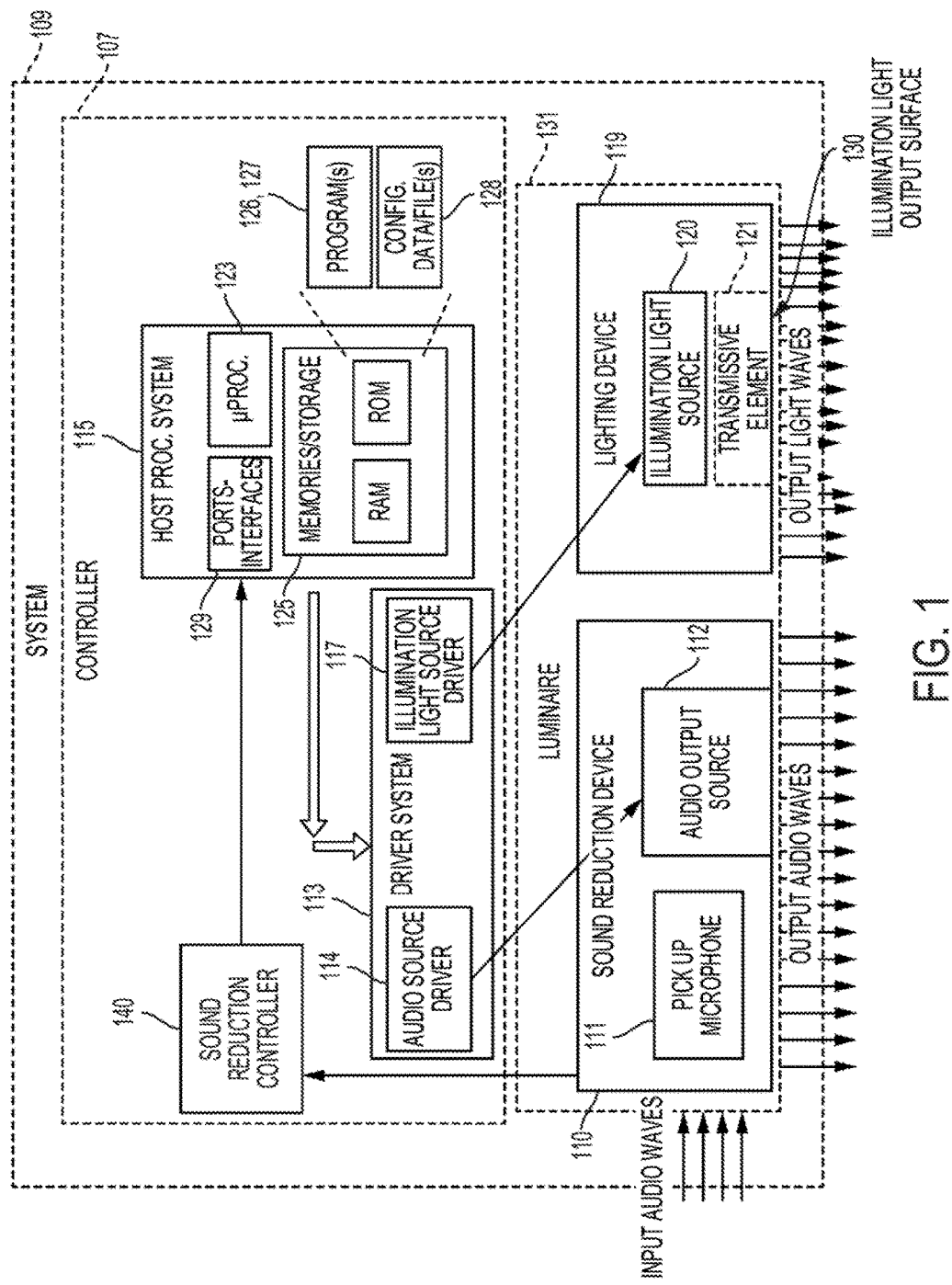
FIG. 1 is a high level functional block diagram of a lighting system that includes a luminaire that may support a lighting device and a sound reduction device, where the control element(s) of the lighting system are configured to implement one or more of the sound control strategies.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one implementation, a luminaire having functionality of a light source to illuminate an area, a pick up microphone to receive an incoming sound and an audio source to output controlled sound in the illuminated area. As such, the luminaire offers both the illumination and the sound control functionality. Also, various examples disclosed herein relate to sound control strategies that coordinate sound output so as to control the sound in the illuminated area that is associated with the incoming sound.

The term "luminaire," as used herein, is intended to encompass essentially any type of device that processes energy to generate or supply artificial light, for example, for illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

In the examples below, the luminaire includes at least one or more components forming a lighting source for generating illumination light as well as a co-located sound reduction device, e.g. integrated/combined with the lighting component(s) of the lighting source into the one structure of the luminaire. The co-located sound reduction device is a device configured to detect incoming audio waves in the vicinity of the luminaire. The lighting source may be configured/oriented in the luminaire such the light outputted from the lighting source is at least partially reflective with respect to the incoming audio wave.

In several illustrated examples, such a combinatorial luminaire may take the form of a light fixture, such as a pendant or drop light or a downlight, or wall wash light or the like. Other fixture mounting arrangements are possible. For example, at least some implementations of the luminaire may be surface mounted on or recess mounted in a wall, ceiling or floor. Orientation of the luminaires and components thereof are shown in the drawings and described below by way of non-limiting examples only. The luminaire with the lighting component(s) and the sound reduction device may take other forms, such as lamps (e.g. table or floor lamps or street lamps) or the like. Additional devices, such as fixed or controllable optical elements, may be included in the luminaire, e.g. to distribute light output from illumination light source. Luminaires in the examples shown in the drawings and described below have illumination component oriented to output light in a light output surface and sound reduction component to output sound in a sound output surface.

Terms such as "lighting system" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source and the sound reduction device, any associated control processor or alternative higher level control circuitry, and/or data communication interface(s). As noted, the lighting component(s) and sound reduction component are co-located into an integral unit, such as a light fixture or lamp implementation of the luminaire. The electronics for driving and/or controlling the lighting component(s) and the sound reduction component may be incorporated within the luminaire or located separately and coupled by appropriate means to the light source component(s) and the sound reduction device.

In several of the examples, the lighting system is software configurable, by programming instructions and/or setting data. e.g. which may be communicated to a processor of the lighting system via a data communication network of a lighting system. Configurable aspects of lighting system operation may include one or more of: a selected image (still or video) for presentation as an image output or one or more parameters (such as intensity and various color related characteristics) of an illumination light output via light output surface of the luminaire. The lighting system is software configurable, by programming instructions and/or setting data, e.g. which may be communicated to a processor of the sound reduction device via a data communication network of a lighting system. Configurable aspects of the sound device operation may include one or more parameters (such as various sound related characteristics) of an audio output via audio light output surface of the luminaire.

The term "coupled" as used herein refers to any logical, physical or electrical connection, link or the like by which signals produced by one element are imparted to another "coupled" element. Unless described otherwise, coupled components, elements or devices are not necessarily directly connected to one another and may be separated by intermediate components, elements, devices or communication media that may modify, manipulate or carry the signals.

Reference now is made in detail to the examples illustrated in the accompanying drawings and discussed below. FIG. 1 illustrates an example of a lighting system 109 including a luminaire 131 as part of the lighting system 109. In the simplified block diagram example, the luminaire 131 includes a lighting device 119 and a sound reduction device 110. The sound reduction device 110 includes a pick up microphone 111 configured to detect an incoming audio waves in a vicinity of the luminaire 131. The sound reduction device 110 also includes an audio output source 112 to output audio waves via the illumination output surface 130. The lighting device 119 includes an illumination light source 120 configured to generate illumination light for emission through the illumination output surface 130 for illumination of an area. In one example, the light source 120 functions as a general illumination light. In another example, the light source 120 functions as a display image, although the lighting device may support a combination of illumination and display functionalities. As shown, the sound reduction device 110 detects incoming audio waves. In one implementation, the illumination output surface 130 of the lighting device 119 is partially reflective with respect to the incoming audio waves from outside the luminaire 131.

In one implementation example, the lighting system 109 includes a controller 107 including a driver system 113 that is coupled to the luminaire 131 to control light outputs generated by the lighting device 119 and to control audio outputs via the audio output source 110 responsive to sounds detected by the microphone 111 of the sound reduction device 110. Although the driver system 113 is implemented as the element of the controller 107, the driver system 113 may be separately located from other elements of the controller 107. The driver system 113 includes two separate driver circuits, an audio source driver 114 and an illumination light source driver 17. The audio source driver 114 is specifically adapted to provide suitable drive signals to the audio output source 112 of the sound reduction device 110. The illumination light source driver 117 is specifically adapted to provide suitable drive signals to the particular type/configuration of the light source 120 of the lighting device 119. In one implementation, the controllable luminaire 131 provides audio output from audio output source 112 of the sound reduction device 110 in response to the audio control signals received from the audio source driver 114. In another implementation, the controllable luminaire 131 provides light output from the illumination light source 120 to the illumination output surface 130 of the lighting device 119 in response to lighting control signals received from the illumination light source driver 117. In one implementation, the controller 107 functions to control sound of the incoming audio wave at least in the illumination area of the illumination output surface 130 as described in greater detail below.

FIG. 1 provides a high level functional block diagram of an example of an implementation of a lighting system 109 that includes a luminaire 131 that may support concurrent outputs from two emitters (audio output source 112 and the illumination light source 120), where the control element(s) of the lighting system 109 are configured to implement one or more of the sound control strategies to control sound at least in an illuminated area as discussed herein. As shown in FIG. 1, in one example, the controller 107 includes a sound reduction controller 140 coupled to a host processor system 115, which is coupled to control operation of the driver system 113, and through the audio source driver 114 of the driver system 113 to control the sound output from the luminaire 131 in at least the illuminated area. In one implementation, the sound reduction controller 140 is configured to receive the input audio waves from the pick up microphone 111 and further process the input audio waves to generate audio control signals to operate the audio output source 112 (See FIG. 2). In one implementation, the audio control signals to operate the audio output source are sent via the audio source driver 113. With advances in circuit design, some or all of the driver system circuitry 113 to 117 and/or the sound reduction controller 140 could be incorporated together with circuitry of the host processor system. Other circuitry may be used in place of the processor based host system 115 (e.g. a purpose built analog or digital logic circuit or an ASIC). In the illustrated example, the driver system 113 together with higher layer control elements of the lighting system 109, such as sound reduction controller 140 and the host processor system 115, serve to control the audio waves outputted by the audio output source 112 in at least in an area illuminated by the illumination light source 120.

In the example of FIG. 1, the host processor system 115 provides the high level logic or "brain" of the controller 107 and thus of the lighting system 109. In the example, the host processor system 115 includes memories/storage 125, such as a random access memory (RAM) and/or a read-only memory (ROM). The system 115 also includes program instructions and/or data at 126 for the lighting control capability and program instructions and/or data at 127 for the sound control capability, stored in one or more of the memories/storage 125. The programs 126, 127 configure the host processor system 115 to control light output of the lighting device 119 and to control audio output of the sound reduction device 110 respectively. The lighting control program 126, in one example, configures the lighting system 109 to implement light output from the lighting device 119 of the controlled luminaire 131 in an area to be illuminated utilizing a lighting control strategy. The sound control 127, in one example, configures the lighting system 109 to implement controlled audio output from the sound reduction device 110 via the controlled luminaire 131 in at least in the illuminated area associated with incoming sound utilizing a sound control strategy.

At a high level, the host processor system 115 is configured to operate the sound reduction device 110 and the lighting device 119 via the driver system 113 to implement functions, including light output functions, which involve light control strategy and sound output functions, which involve a sound control strategy. For example, the lighting device 119 outputs the light via the illumination output surface 130 of the luminaire 131 and the sound reduction device 110 outputs audio also via the illumination light output surface 130 of the luminaire 131. In one implementation, the lighting device includes a transmissive or substantially transparent element 121 such as a diffuser and the illumination light output surface 130 is output surface of the transmissive element 121. In one example, the transmissive element (i.e. diffuser) 121 is also a diaphragm (FIGS. 8A, 8B, 9A, 9B, 10A and 10B) for such that the illumination light output surface 130 is also the sound/audio output surface of the audio output source 112.

In the example, the host processor system 115 controls operation of the luminaire 131 based on light settings corresponding to the lighting device 119 and on audio settings corresponding to the sound reduction device 110 and responsive to aspects of incoming audio waves detected by the pickup microphone 111. Both types of settings may be part of the respective programs 126 and 127 or may be stored as one or more configuration files 128 in memory 125 in the controller 107 or received as streaming data for temporary storage (buffering in local memory). The illumination operation may also be controlled in response to sensed inputs (from a sensor not separately shown for convenience) on the sound reduction programming of the host processor system 115 and/or appropriate sound source control data enable the host processor system 115 to implement various sound control strategies based on phase shift, inversion, destructive interference etc. as discussed herein.

As outlined above, the memories/storage 125 may store various data, including luminaire configuration information in the form of one or more configuration files. Examples of luminaire configuration information include illumination setting data, sound reduction setting data, communication configuration or other provisioning data, or the like. The relevant data may be generated remotely at a server or the like and implemented in information data streamed or downloaded to the controller 107 Updates or modifications to such data may be implemented during system operation, for example, based on a machine learning analysis appropriate sensed inputs.

The host processor system 115 includes a central processing unit (CPU), shown by way of example as a microprocessor (μProc.) 123, although other processor hardware may serve as the CPU. The CPU and memories, for example, may be implemented by a suitable system-on-a-chip often referred to as a micro-control unit (MCU). In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the processor 123 of the controller 107. The processor 123 may include one or more cores. Although the illustrated example includes only one microprocessor 123, for convenience, a controller 107 may use a multi-processor architecture.

In an example of the operation of the lighting system, 109, the processor 123 receives a configuration file via one or more of communication interfaces (not shown). The processor 123 may store, or cache, the received configuration file in storage/memories 125. In one example, the file may include light data. The light data file may be stored, as part of or along with the received configuration file in storage/memories 125. A configurable lighting system such as the system 109 may be reconfigured, e.g. to change data of the light output and/or to change one or more parameters of the light output, by changing the corresponding aspect(s) of the configuration light data file, by replacing the configuration light data file, or by selecting a different file from among a number of such light data files already stored in the data storage/memories 125. In the operational examples, based on its programming and/or data for lighting control 126, the processor 123 processes data retrieved from the memory 125 and/or other data storage, and responds to light setting parameters in the configuration data 128 retrieved from memory 125 to control the light generation by the lighting device 119. Some examples of controlling the light generation includes but is not limited to turning light on or off, adjusting output light intensity, adjusting output light color characteristic (if the source 120 is tunable), changing an image or otherwise adjusting a display output (if the source 120 offers a display function) etc.

In another example, the file may include audio data. The audio data file may be stored, as part of or along with the received configuration file in storage/memories 125. The configuration file(s) 128 in memory 125 may also provide sound setting parameters in the configuration data, which the host processor system 115 uses to control the driver and thus the sound emission from the sound reduction device 110. Some examples of the sound setting parameters include but not limited to output amplitude setting, a degree of a phase shift in the output, sensitivity to detected sound wave amplitude (in the input), a frequency range (like a band pass filtering range) of detection of audio signals from the microphone etc. A configurable lighting system such as the system 109 may be reconfigured, e.g. to change data of the audio output and/or to change one or more parameters of the audio output, by changing the corresponding aspect(s) of the configuration sound data file, by replacing the configuration sound data file, or by selecting a different file from among a number of such sound data files already stored in the data storage/memories 125. In the operational examples, based on its programming and/or data for sound control 127, the processor 123 processes data retrieved from the memory 125 and/or other data storage, and responds to sound setting parameters in the configuration data 128 retrieved from memory 125 to control the sound by the sound reduction device 110. Accordingly, the processor 123 controls the active incoming sound by utilizing the programming to process the audio data file (i.e. audio either pre-recorded in the memory 125 or generated by the programming). In one example, controlling the sound includes reducing noise of the incoming sound.

In other examples, the lighting system 109 may be programmed to transmit information on the light output from the luminaire 131. Examples of information that the lighting device 119 may transmit in this way include a code, e.g. to identify the luminaire 131 and/or the lighting device 119 and/or the sound reduction device 110 or to identify the luminaire location. Alternatively or in addition, the light output from the luminaire 131 may carry downstream transmission of communication signaling and/or user data.

In addition, the luminaire 131 is not size restricted. For example, each luminaire 131 may be of a standard size, e.g. 2-feet by 2-feet (2×2), 2-feet by 4-feet (2×4), or the like, and arranged like tiles for larger area coverage. In one example, the tiles are controlled independently or together from a central or master controller. Alternatively, one luminaire 131 may be a larger area device that covers a wall, a part of a wall, part of a ceiling, an entire ceiling, or some combination of portions or all of a ceiling and wall.

Figure 2:
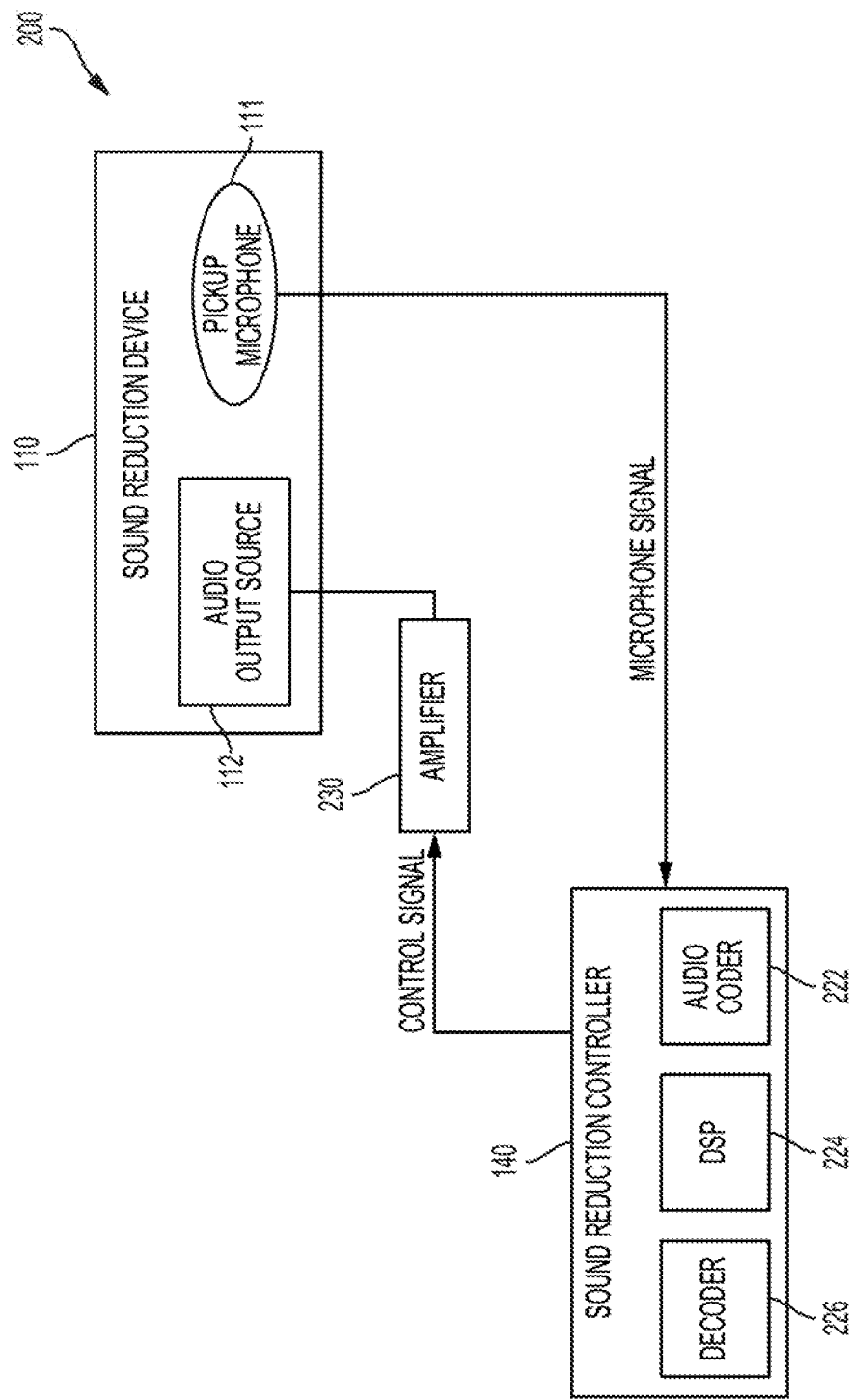
FIG. 2 is a high level functional block diagram of an implementation of a sound control system in the lighting system of FIG. 1.

FIG. 2 is a high level functional block diagram of an implementation of a system 200 for controlling sound in the lighting system of FIG. 1. As shown, the system 200 includes the sound reduction device 110 coupled to the sound reduction controller 140. As discussed above, the sound reduction device 110 functions to control one or more of the parameters of the outgoing (e.g. effectively reflected) audio waves responsive to the incoming audio waves at least in the vicinity of the illuminated area served by the illumination output surface 130 of the lighting device 119. The parameters of the output audio wave include but are not limited to frequency range, phase shift, amplitude or the like. In one implementation, the system controls the parameters of the output audio wave based on the sound reduction strategy.

The sound reduction device 110 includes the pickup microphone 111 and the audio output source 112. In one implementation, the audio output source 112 includes a diaphragm with either an actuator (pin or air or electrostatic) or a piezoelectric transducer coupled to the diaphragm to activate the diaphragm (See FIGS. 6A, 6B, 7A, 7B, 9A, 9B, 10A, and 10B). The system 200 also includes an amplifier 230 coupled to the sound reduction device 110 and the sound reduction controller 140. In one example, the amplifier 230 is located in the sound reduction device 110. In another example, the amplifier 230 is located in the sound reduction controller 140. In one implementation, the sound reduction controller 140 is a circuitry, which includes an audio coder 222, a digital signal processor (DSP) 224 and a decoder 226, functions of which are described in greater detail below.

In one implementation, the sound reduction controller 140 receives analog microphone signals from the pickup microphone 111. The microphone analog signals represent the incoming audio waves detected in the vicinity of the luminaire 131 as discussed above with respect to FIG. 1. The audio coder 222 converts the analog microphone signals to digital input signals. The DSP 224 is coupled to the audio coder 222 to receive the digital input signals from the audio coder 222. The DSP 224 utilizes an adaptive algorithm, for example, to analyze a waveform of a noise associated with the incoming audio waves represented by the digital input signals and generates an output (analog or digital) signal tailored to a noise reduction strategy. The operations of the DSP 224 are configurable in response to instructions from the host processing system 115, for example, to set parameters of the digital input signal processing (e.g. related to sensitivity level and/or a frequency range of sensitivity) and/or parameters of the digital output signal processing. For example, the instructions may cause the DSP 224 to generate a digital output signal representing at least a phase shift waveform or an inverted polarity waveform relative to a waveform of noise in the incoming audio waves. For a selected output waveform type, the host processing system 115 may instruct the DSP 224 to set parameters such as amplitude, frequency range, or the like. The decoder 226 is coupled to the DSP 224 and thus receives the digital output signal from the DSP 224. The decoder 226 converts the digital output signal into an analog output signal, for example, representing the selected phase shifted or inverted polarity of the waveform of the particular amplitude and/or frequency range. The decoder 226 feeds the analog output signals to the amplifier 230 which amplifies the analog output signals to drive the audio output source 112. Specifically, the amplifier 230 increased amplitude of the phase shifted or inverted polarity of the waveform of the noise. The amplified analog output signals are transmitted to the audio output source 112. The amplified analog output signals function to operate the audio output source 112 so that the audio waves outputted from the audio output source 112 at the illumination output surface 130 are controlled audio waves, which in the phase shifted or inverted polarity examples are directly proportional to amplitude of the waveform of the noise associated with the incoming audio waves to create a destructive interference between the incoming audio waves and the amplified output audio waves. In one implementation, the destructive interference effectively reduces volume of the overall audio waves at least in the illumination area served by the lighting device 119.

Figure 3:
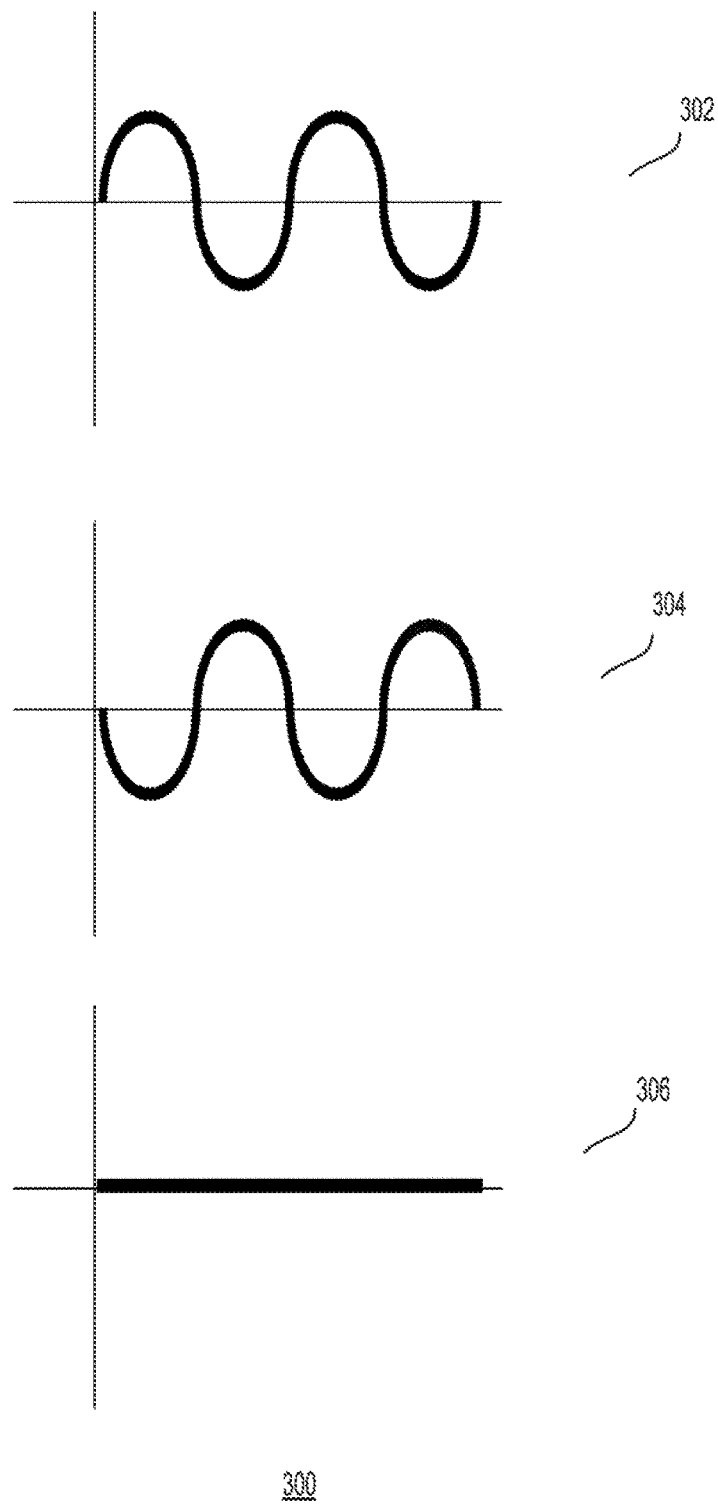
FIG. 3 is a graphical representation of an incoming sound wave being canceled out and out of phase sound wave from the sound reduction controller of the sound control system of FIG. 2.

FIG. 3 is a graphical representation 300 of waveform illustrating an incoming sound wave being canceled out by an out of phase sound wave from the sound reduction controller of the sound control system of FIG. 2. Specifically, an incoming sound, illustrated as input audio wave 302 is received via the microphone 11l. As discussed above, the illumination output surface 130 of the lighting device 119 is at least partially reflective with respect to the input audio wave 302.

The DSP 224 of the sound reduction controller 140 functions to analyze the noise of the incoming sound, illustrated as an input audio wave 302 and then generates a signal that is either phase shift or invert polarity of the original signal (incoming audio wave 302). The phase shifted or inverted polarity signal is an out of phase sound, illustrated as out of phase/inverted audio wave 304. This out of phase/inverted audio wave 304 is then amplified using the amplifier 228, which is fed into the audio output source 112. As such, the audio output source 112 would be at the same frequency as the incoming sound but just 180 degrees out of phase. The input audio wave 302 and the out of phase audio wave 304 combine to form a new wave, process of which is known as interference. In one example, the interference is a constructive interference. In another example, the interference is a destructive interference. In a further example, the interference is a combination of constructive and destructive interference depending on exact phase difference at a given point. The input audio wave 302 and out of phase audio wave 304 effectively cancel each other out resulting in an output audio wave 306, which is a resulting suppressed sound (e.g. no sound), an effect of which is known as destructive interference. Specifically, the audio output source 112 functions to create an output sound, i.e. the output audio wave 306 which is the controlled audio wave and in the phase shifted or inverted polarity examples is directly proportional to amplitude of a waveform of the noise associated with the incoming audio wave 302 to create the destructive interference between the incoming audio wave 304 and the output audio wave 306. The destructive interference effectively reduces volume of the incoming audio wave 302 reflected from the illumination output surface 130 of the lighting device 119.

Figure 4:
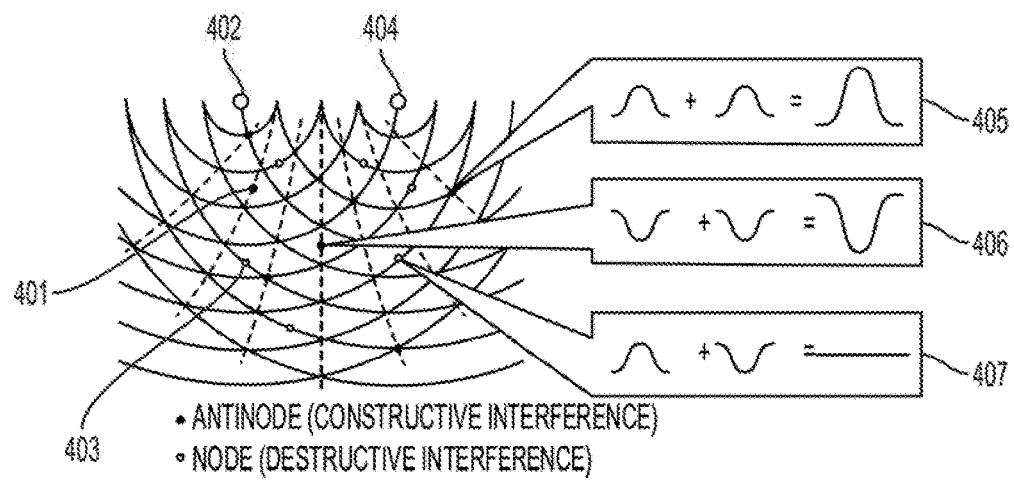
FIG. 4 is an example illustrating audio waves at an illumination light output surface in a vicinity of the luminaire of the lighting system of FIG. 1.

FIG. 4 is an example illustrating audio waves at the illumination output surface 130 in the vicinity of the luminaire 131 of the lighting system 109 of FIG. 1. In this example, the audio output source 112 is illustrated as two actuators, first and second actuators 402 and 404, which function to actuate the diaphragm (not shown). In one example, the first and the second actuators are pin actuators. In another example, the first and the second actuators are air actuators. In another example, the first and the second actuators are electrostatic actuators. In a further example, the first and the second actuators are piezoelectric transducers. Although two actuators are illustrated, it is known to one of ordinary skill in the art, that a single actuator may be utilized to actuate the diaphragm. An interference can occur as a result of sound picked by the first and the second actuators 402 and 404 respectively at respectively at the same location, i.e. within the luminaire 131. In one implementation, both constructive and destructive interference can be generated by the two actuators, i.e. the first and the second actuators 402 and 404 respectively based on the phase difference of the signals.

In one implementation, during operation, both the first and the second actuators 402 and 404 are driven at the same time causing the constructive and destructive interference.

As shown are the two generated audio waves illustrated as waveforms 405 and 406, which when combined together interference illustrated as waveform 407. In one implementation, the constructive interference is illustrated at a first node 401. The first node 401 is a location in the vicinity of the illumination area of the illumination output surface 130 where constructive interference continuously occurs resulting in a high volume (loud) sound. In one implementation, the destructive interference is illustrated at a second node 403. The second node 403 represents a location in the vicinity of the illumination area of the illumination output surface 130 where destructive interference continuously occurs resulting in reduced volume of the overall sound. As a result, the destructive interference effectively reduces the volume of the input audio waves 302 reflected from illumination output surface 130 of the lighting device 119.

Figure 5:
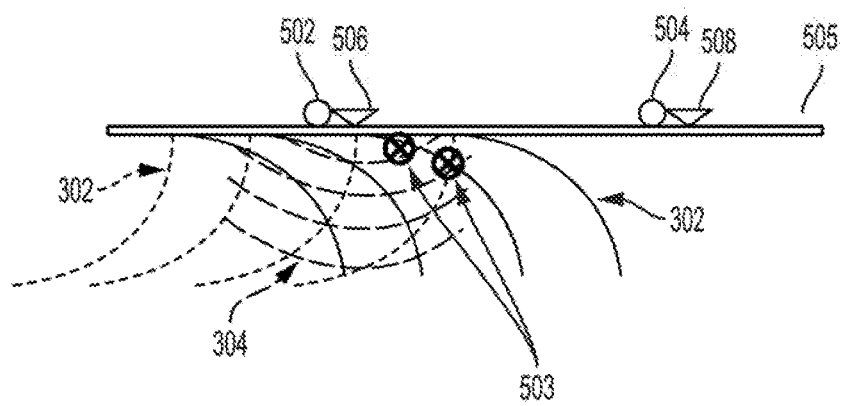
FIG. 5 is an example illustrating an example of the sound reduction device (including the input and output audio waves) in the vicinity of the luminaire of the lighting system of FIG. 1.

FIG. 5 illustrates an example of a sound reduction device 110 (including input and output audio waves illustrated at the illumination output surface 130) in the vicinity of the luminaire 131 of the lighting system 109 of FIG. 1. In this example, the audio output source 112 includes two actuators, a first actuator 502 and a second actuator 504 coupled to a diaphragm 505. Also, shown are two pick up microphones a first and second microphone 506 and 508 respectively, positioned adjacent to the first and the second actuators 502 and 504 respectively. The first and the second microphones 506 and 508 respectively function similar to the pick up microphone 111 configured to detect incoming audio waves at their respective first and the second actuators 502 and 504 respectively in a vicinity of the luminaire 131. An interference can occur as a result of sound from the first and the second actuators 502 and 504 respectively at the same location, i.e. within the luminaire 131.

In one example, the incoming sound is received in a direction such the incoming sound detected by the first microphone 506, causing the first actuator 502 to activate to actuate the diaphragm 505 and cancel out the incoming sound before reaching the second microphone 508. The second actuator 504 is also activated when the sound is detected by the second microphone 508, which also cancels out the incoming sound. Although, the example in FIG. 5 illustrates the incoming sound is detected by the first microphone 506 before being detected by the second microphone 508 causing the first actuator 502 to be actuated before causing the second actuator 504 to be actuated, it is known to one of ordinary skill in the art that if the incoming sound was being receiving in a different direction, the incoming sound would be detected by the second microphone 508 before being detected by the first microphone 506, thus causing the second actuator 504 to be actuated before causing the first actuator 502 to be actuated. As shown, is an incoming sound represented as input audio waves 302 and an out of phase sound represented as out of phase audio wave 304. Also, shown is a reflection sound, represented by reflection wave 302', which is the input audio waves reflected due to the illumination output surface 130 being at least partially reflective with respect to the input audio wave 302. As discussed above, the input audio waves 302 and out of phase/inverted audio waves 304 effectively cancel each other out resulting in an out of phase sound represented as output audio wave 306, effect of which is known as the destructive interference illustrated as node 503. The node 503 represents a location in the vicinity of the illumination area of the illumination output surface 130. As a result, the destructive interference reduces the volume of the input audio waves 302 reflected from the illumination output surface 130 of the lighting device 119, thus controlling the noise of the incoming sound.

In one implementation, a target frequency is set for one or more actuators to act out of phase to counter act the incoming sound. In one example, the target frequency range for the system is between 20 Hz to 20,000 Hz. For a particular system, the target frequency range can be a narrow range. The number of actuators is determined based on the target frequency range such that the number of actuators is proportional to the target frequency range. In one example, the target frequency range is between 300 Hz to 640 Hz and thus two actuators, i.e. the first and the second actuators 502 and 504 respectively are selected to act out of phase, thus cancelling this the frequencies in this target frequency range. In another implementation, the distance between each of the actuators is determined based on the target frequency range such that the distance between the actuators is in inverse relationship with the target frequency range. In one implementation, the distance between the actuators is based on wavelength of the sound.

Figure 6A:
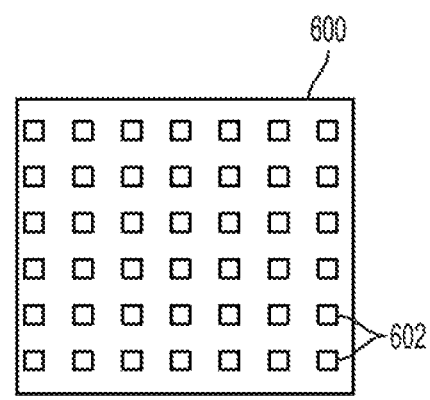
FIG. 6A illustrates one example of the audio output source in the luminaire of the lighting system FIG. 1.

FIG. 6A illustrates one example of the audio output source 112 in the luminaire 131 of the lighting system 109 of FIG. 1. In this example, the audio output source 112 includes a diaphragm 600 with multiple actuators 602 coupled to a diaphragm 600. In one example, the diaphragm 600 is a clear/transparent solid element. In another example, the diaphragm 600 is a t translucent element.

Each of the multiple actuators 602 are activated independently (i.e. not necessarily have to be connected to one another) and acting cooperatively (i.e. activating as needed to cancel out the incoming wavefront) to act to suppress the sound wave, their timing comes from the sound wave itself, and thus configured to act out of phase to counter act the incoming sound. In one example, the target frequency range is at a higher range, approximately 28,000 Hz or even outside the human range. As such many actuators 602 are implemented to act out of phase, thus cancelling the frequencies in this target frequency range, yet distance between each of the actuators 602 is small. In one example, the diaphragm 600 with multiple array of actuators 602 is installed in a single light fixture to cancel or suppress the incoming sound.

Figure 6B:
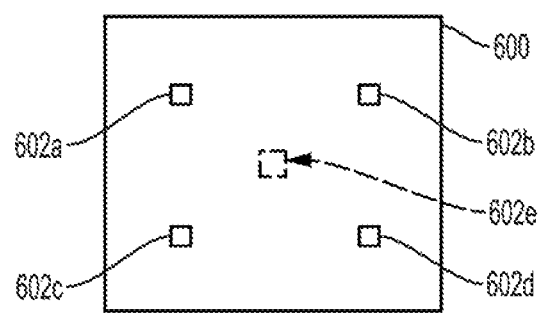
FIG. 6B illustrates another example of the audio output source in the luminaire of the lighting system of FIG. 1.

FIG. 6B illustrates another example of the audio output source 112 in the luminaire 131 of the lighting system 109 of FIG. 1. In this example, the audio output source 112 includes the diaphragm 600 with five actuators 602a, 602b, 602c, 602d and 602e coupled to the diaphragm 600. In this example, only one actuator, for example, 602e is activated and thus configured to act out of phase to counter act the incoming low frequency sound. In one example, the target frequency range is at a lower range, approximately between 30 Hz to 300 Hz. As such one actuator, e.g. 602e may be sufficient to be activated to cancel the frequencies in this target frequency range. In one implementation, all five actuators 602a, 602b, 602c, 602d and 602e may be activated to cancel the frequencies in a much higher target frequency range. In one example, distance between each of the actuators 602a-602e is wide. In one example, the diaphragm 600 with a single actuator being activated is placed in each of the multiple array of light fixtures placed in close proximity of each other cancel or suppress the incoming high frequency sound.

Figure 7A:
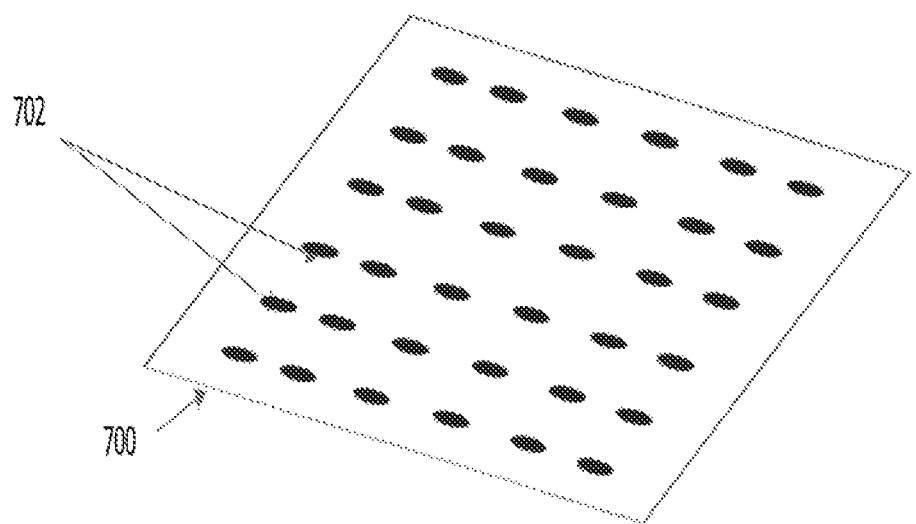
FIG. 7A illustrates another example of the audio output source in the luminaire of the lighting system of FIG. 1.

FIG. 7A illustrates another example of the audio output source 112 in the luminaire 131 of the lighting system 109 of FIG. 1. In this example, the audio output source 112 includes a diaphragm 700 with multiple piezoelectric transducers (transducers) 702 coupled to the diaphragm 700. In one example, the diaphragm 700 is a clear solid element. In another example, the diaphragm 700 is a translucent element, such as a diffuser. Each of the multiple transducers 702 function similar to the actuators such that they are configured to act out of phase to counter act the incoming sound. In this example, the transducers 702 are thin layer of piezoelectric material. A change in electric field is caused by the transducers 702, which convert sound signals to electrical currents/signals, which may be amplified. The vibration of the diaphragm may be measured or induced electronically using the transducers 702.

Figure 7B:
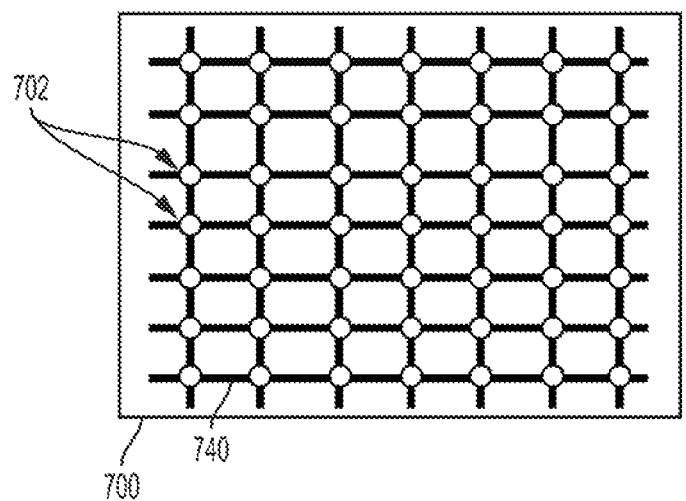
FIG. 7B illustrates a further example of the audio output source in the luminaire of the lighting system of FIG. 1.

FIG. 7B illustrates a further example of the audio output source 112 in the luminaire 131 of the lighting system 109 of FIG. 1. In this example, the audio output source 112 includes the diaphragm 700 with the multiple piezoelectric transducers (transducers) 702 coupled to the diaphragm 700. Also, shown are electrical control lines/conductors 740 that interface between the transducers 702. A change in electric field between the diaphragm 700 and the control lines 740 is caused by the transducers 720.

Figure 8A:
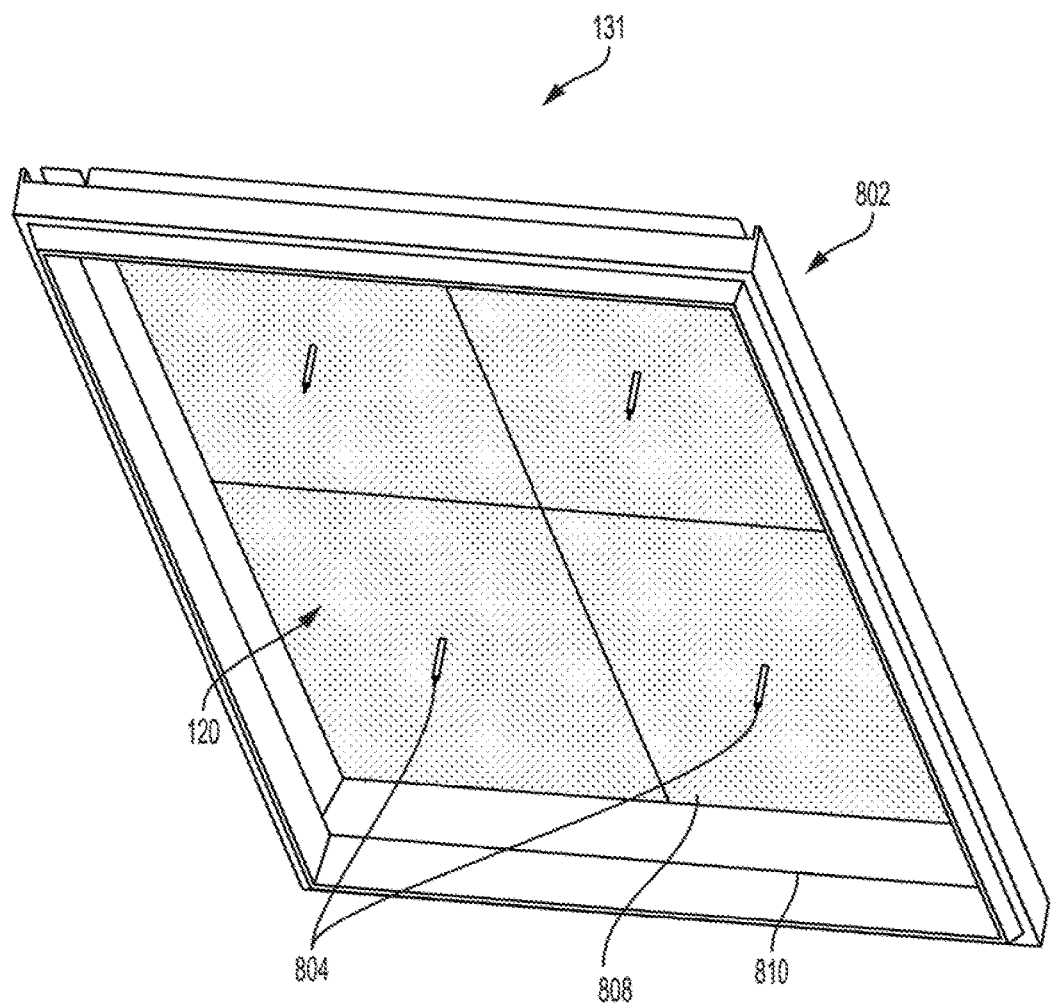
FIG. 8A illustrates one implementation of the luminaire of the lighting system of FIG. 1.

FIGS. 8A and 8B illustrates one implementation of the luminaire 131 (including the lighting device 119 and the sound reduction device 110) in the lighting system 109 of FIG. 1. In one example, the luminaire 131 is mounted on a ceiling (not shown). As shown, the luminaire 131 includes a housing 802 and the illumination light source 120 (e.g. LED) mounted within the housing 802 and actuators 804 as part of the audio output source 112 also mounted within the housing 802. In this example, the actuators 804 are placed between the illumination light source 120 and a diaphragm 808. The illumination light source 120 is configured to emit light sufficient for illumination of an area. The actuators 804 operated by the sound reduction controller 140 are configured to actuate the diaphragm 808) to emit the output controlled sound at least in the illuminated area with the incoming sound.

The luminaire 131 also includes a panel or a frame 810 supported by the housing 802. The panel 810 is located such that it receives light at one or more light input surfaces of the panel 810 and outputs the received light via the illumination output surface 130 of the panel 810 facing the area. In this example, panel 810 may be formed from any suitable waveguide material, such as glass, plastic, or acrylic.

Panel 810 is supported by the housing 802, and is configured to receive light from the illumination light source 120 at one or more light input surfaces of panel 810, and output the received light from light source 120 via one or more light output surfaces of panel 810 to the area to be illuminated by the luminaire 131. Panel 810 may be formed from any desired material which allows the light from light source 120 to illuminate the area. For example, panel 810 may be formed from material which allows light from light source 120 to propagate within the material of panel 810 from the light input surface(s) to the light output surface(s). Panel 810 may be transparent, translucent, diffusive, or may filter light from light source 120. Panel 810 defines the illumination output surface 130 facing the area under illumination.

In one example, light guide is used as the diaphragm 808 for the sound audio output. The light guide, which receives and guides light from illumination light source 120 with minimal loss or absorption, as shown in FIGS. 8A and 8B. The light guide has a major surface facing the area under illumination. The major surface is bounded by lateral edges, e.g., four edges for a rectilinear light guide. In this example, the major surface of the light guide defines a light output surface of the light guide, and the lateral edges of the light guide define light input surfaces of the light guide. The illumination light source 120 is coupled to supply light to one or more of the lateral edges of the light guide, and the light guide is configured to allow light to propagate within the light guide and exit via the major surface of the light guide. The major surface of the light guide may thereby form the illumination output surface 130 of panel 810. In this example, diaphragm may be formed from any suitable waveguide material, such as glass, plastic, or acrylic.

In another example, an optical diffuser is used as the diaphragm 808 for the sound audio output. The optical diffuser diffuses and softens light from illumination light source 120. The optical diffuser may be formed from any suitable material for diffusing light, such as, for example, acrylic material.

In a further example, the optical diffuser may be coupled to or integrally formed with the major surface of the light guide. The optical diffuser may be positioned below the light guide, and thereby receive light exiting the light guide. The diffuser may receive the light from the light guide at one or more light input surfaces, and may further define the illumination output surface 130 on a surface of the diffuser facing the area under illumination. Alternatively, the optical diffuser may be provided between the illumination light source 120 and the light guide, to diffuse light prior to the light being received by the one or more input surfaces of the light guide.

Figure 9A:
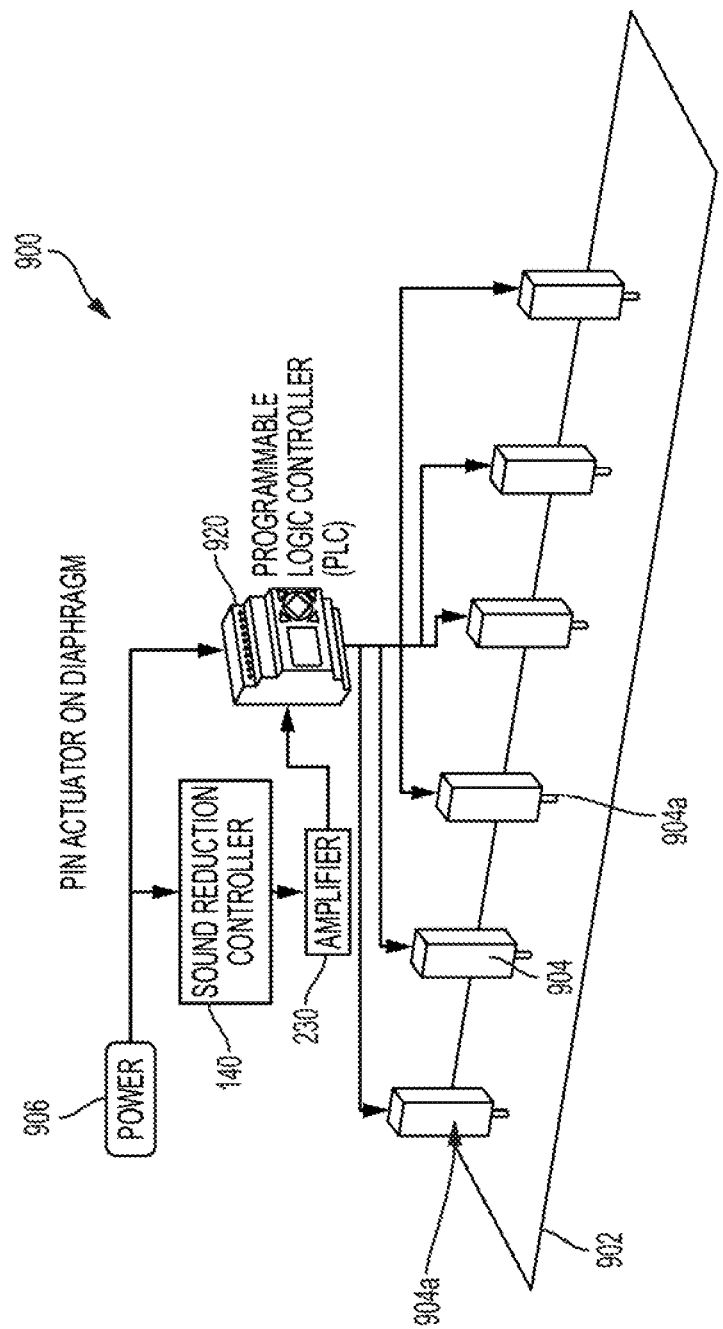
FIG. 9A illustrates one implementation of the system for controlling sound in the lighting system of FIG. 1.

FIG. 9A illustrates one implementation of the system 900 for controlling sound in the lighting system 109 of FIG. 1. As shown, the system 900 includes a diaphragm 902 as the audio output source 112 with multiple pin actuators 904 coupled to the diaphragm 902. Each of the pin actuators 904 include a pin 904a which functions to apply pressure in a linear motion. In one implementation, a force is applied via the pin 904a by the pin actuators 904 to the diaphragm to induce an out of phase relationship between frequency of waves of the output controlled sound and the frequency of the incoming sound waves. The force applied is dependent on several factors including but not limited to thickness of the diaphragm 902, size of the pin actuator 904, amount of force applied by the pin actuator 904 on the diaphragm 902, or strength of pressure against the diaphragm 902. A solenoid valve (not shown) is connected at the bottom of the pin actuator 904, which functions to control the pressure applied to the diaphragm 902.

Also shown is a power source 906 which functions to power the sound reduction controller 140 and a programmable logic controller (PLC) 920, which includes the host processing system 115 and the audio source driver 114 of FIG. 1 As discussed above with respect to FIG. 2, the analog output signals from the sound reduction controller 140 represent the phase shifted or inverted polarity of the waveform, which are fed into the amplifier 230, which functions to amplify the output signals. The amplified output signals are fed into the PLC 920. Upon receipt of the amplified output signals, the PLC 920 as part of the host processing system 115 functions to drive the audio source driver 114 to drive/operate one or more of the pin actuators 904 to apply the force via the pin 904a to the diaphragm 902, which causes the diaphragm 908 to vibrate. Such vibration induces an out of phase relationship between frequency of waves of the output controlled sound and the frequency of the incoming sound waves creating the destructive interference. As discussed above, the destructive interference effectively reduces volume of the incoming audio waves reflected from the illumination output surface 130 of the lighting device 119, thus controlling the noise of the incoming sound. In one implementation, the PLC 920 controls which actuator 904 is operating at a time based on the direction of the incoming sound. For example, the incoming sound is coming from left, accordingly, the PLC 920 functions to activate each of the actuators 904 by first activating the actuator 904 all the way on the left side of the diaphragm 902 and then continue with activating each of the actuators 904 towards the right side of the diaphragm 902 up until including actuating the actuator 904 all the way on right side of the diaphragm 902. Each actuator 904 functions to cancel out of phase with each other. As such each actuator 904 function independently during activation yet cooperatively function to cancel out phase with each other.

Figure 9B:
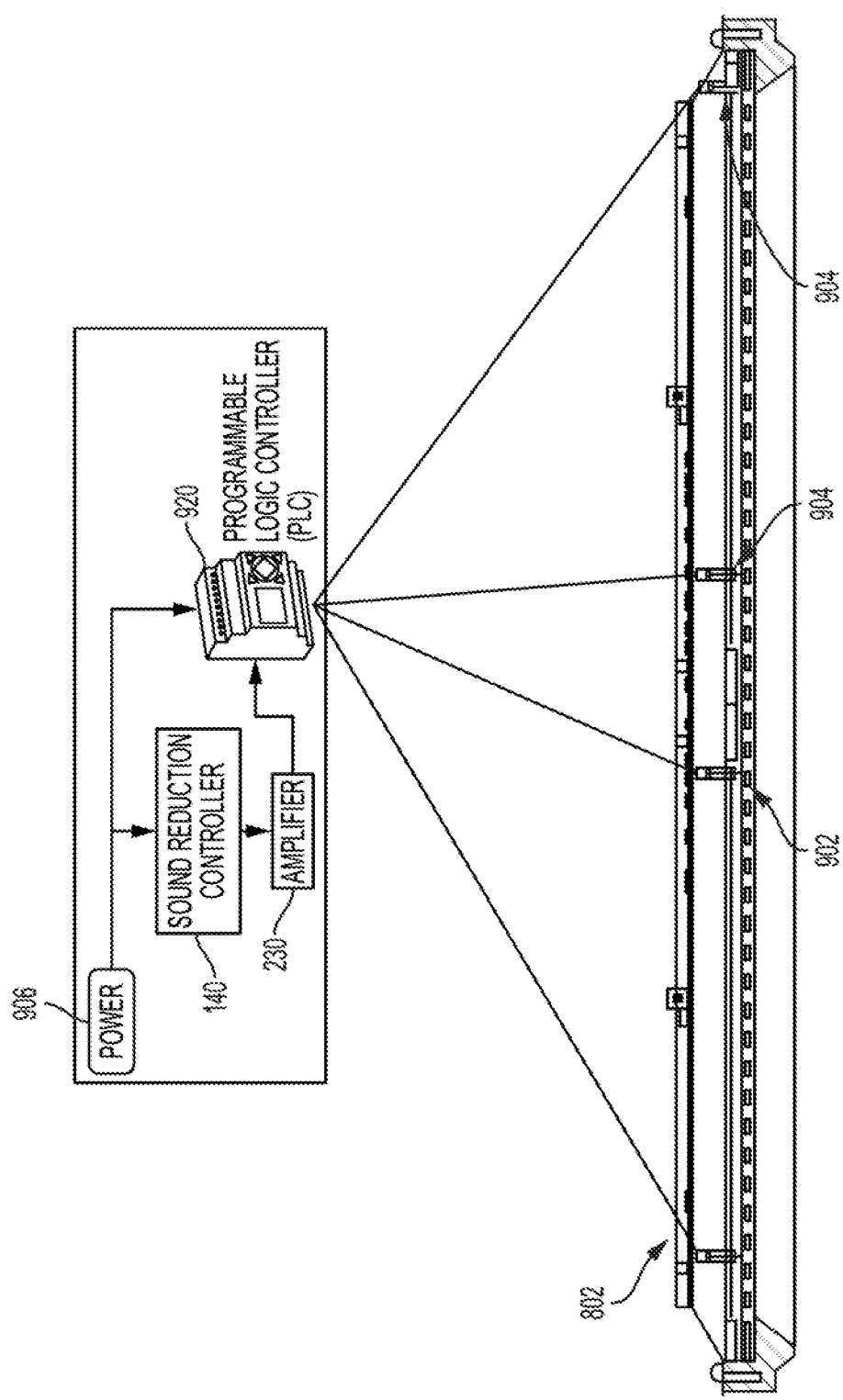
FIG. 9B illustrates one implementation of placement of components of the system of FIG. 9A with respect to an example of the luminaire of the lighting system FIG. 1.

FIG. 9B illustrates the placement of the components of the system 900 of FIG. 9A with respect to an example of the luminaire 131 in the lighting system of FIG. 1. Specifically, illustrated is a cross-section view of the housing 802 of the luminaire 131. As shown, the housing 802 includes the diaphragm 902 and the pin actuators 904 coupled to the diaphragm 902. In one implementation, the power source 906, the sound reduction controller 140, the PLC 920 and the amplifier 230 are placed at an exterior of the housing 802 of the luminaire 131. In one implementation, the diaphragm 902 is both the illumination output surface 130 reflected with respect to the audio wave and the diffuser of the light providing the illumination output surface 130. In one implementation, the diaphragm 902 is transparent (as illustrated in FIG. 9A) and is separate from the diffuser.

Figure 10A:
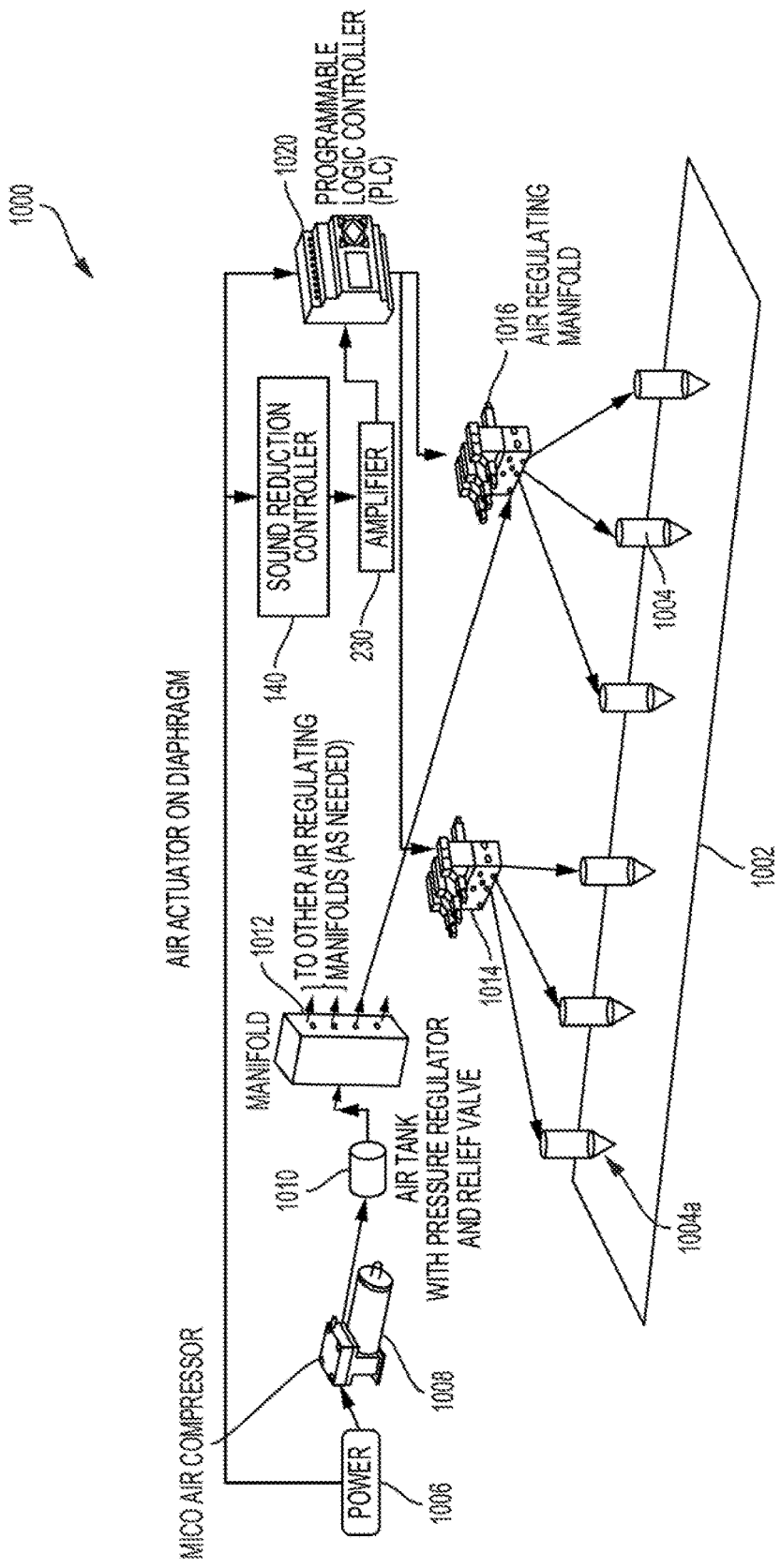
FIG. 10A illustrates another implementation of the system for controlling sound in the lighting system of FIG. 1.

FIG. 10A illustrates another implementation of the system 1000 for controlling sound in the lighting system 109 of FIG. 1. As shown, the system 1000 includes a diaphragm 1002 as the audio output source 112 with multiple air actuators 1004 coupled to the diaphragm 1002. Each of the air actuators 1004 include an air nozzle 1004a which functions to output air at a force. In one implementation, a force is applied by the air actuators 1004 via the air nozzle 1004a to the diaphragm 1002 to induce an out of phase relationship between frequency of waves of the output controlled sound and the frequency of the incoming sound waves. The force applied is dependent on several factors including but not limited to thickness of the diaphragm 1002, size of the air actuator 1004, amount of force applied by the air actuator 1004 on the diaphragm 1002, or strength of air pressure against the diaphragm 1002.

Also shown is a power source 1006 which functions to power the sound reduction controller 140 and a programmable logic controller (PLC) 1020, which includes the host processing system 115 and the audio source driver 114 of FIG. 1. The system 1000 also includes a micro air compressor 1008 also powered by the power source 1006. The system 1000 further includes an air tank 1010 coupled to the micro air compressor 1008, a manifold 1012 coupled to the air compressor 1008 and air regulating manifolds 1014 and 1016 coupled to the manifold 1012. In one implementation, the micro air compressor 1008 releases air and some of the air is held by the air tank 1010 to control flow of the air. The manifold 1012 includes a single opening to receive the air from the air tank 1010. The manifold 1012 also includes multiple openings to output the received air to the air regulating manifolds 1014 and 1016. The air regulating manifolds 1014 and 1016 function as a pathway to distribute air from the manifold 1012 to the air actuators 1004. Each of the air regulation manifolds 1014 and 1016 includes three sets of solenoid valves, which functions to control the air and distribute the controlled air to their respective air actuators 1004. Although, only two air regulating manifolds 1014 and 1016 are shown, it is known to one of ordinary skill in the art that only one air regulating manifold may be used or more than one air regulating manifold may be utilized to distribute the air to the air actuators 1004.

As discussed above with respect to FIG. 2, the analog output signals from the sound reduction controller 140 represent the phase shifted or inverted polarity of the waveform, which are fed into the amplifier 230, which functions to amplify the output signals. The amplified output signals output signals are fed into the PLC 1020. Upon receipt of the amplified output signals, the PLC 1020 as part of the host processing system 115 functions to drive the audio source driver 114 to drive/operate one or more of the air regulating manifolds 1014 and 1016 to pass the air to the air actuators 1004. In one implementation, the PLC 1020 of the host processing system 115 selects which air regulating manifolds 1014 and 1016 to drive at a time in order to pass the air to the air actuators 1004. In one implementation, the air regulating manifolds 1014 and 1016 are selected based on the direction of the incoming sound. The air in the air actuators 1004 would pass through the air nozzle 1004a at high speed, thus applying the force of air pressure, which causes the diaphragm 1002 to vibrate. Such vibration induces an out of phase relationship between frequency of waves of the output controlled sound and the frequency of the incoming sound waves creating the destructive interference. As discussed above, the destructive interference effectively reduces volume of the incoming audio waves reflected from the illumination output surface 130 of the lighting device 119, thus controlling the noise of the incoming sound.

Figure 10B:
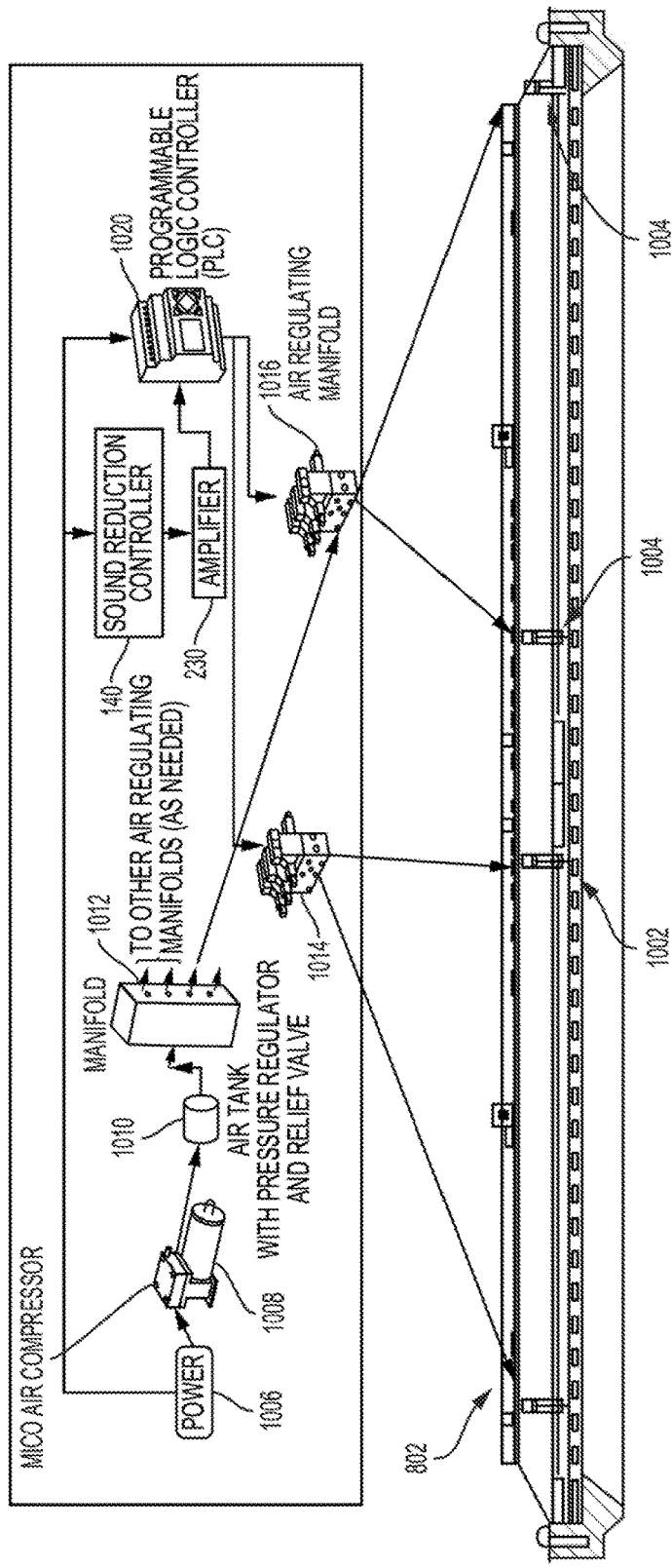
FIG. 10B illustrates one implementation of placement of components of the system of FIG. 10A with respect to an example of the luminaire of the lighting system of FIG. 1.

FIG. 10B illustrates the placement of the components of the system 1000 of FIG. 10A with respect to an example of the luminaire 131 in the lighting system 109 of FIG. 1. Specifically, illustrated is a cross-section view of the housing 802 of the luminaire 131. As shown, the housing 802 includes the diaphragm 1002 and the air actuators 1004 coupled to the diaphragm 102. In one implementation, the power source 1006, the sound reduction controller 140, the PLC 1020, the amplifier 230, the micro air compressor 1008, air tank 1010, manifold 1012 and air regulating manifolds 1014 and 1016 are placed at an exterior of the housing 802 of the luminaire 131. In one implementation, the diaphragm 1002 is both the illumination output surface 130 reflected with respect to the audio wave and the diffuser of the light providing the illumination output surface 130. In one implementation, the diaphragm 1002 is transparent (as illustrated in FIG. 10A) and is separate from the diffuser.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   (I) a luminaire, including:
      (A) a lighting device including:
         (i) an illumination light output surface, the illumination light output surface being at least partially reflective with respect to an audio wave from outside the luminaire; and
         (ii) a source of an illumination light configured to generate illumination light for emission through the illumination output surface for illumination of an area;
      (B) a sound reduction device including:
         (i) a pick up microphone configured to detect incoming audio waves in vicinity of the luminaire;
         (ii) an audio output source comprising a diaphragm;
         (iii) a number of actuators coupled to the diaphragm; and
   (II) circuitry coupled to the sound reduction device, the circuitry including a sound reduction controller coupled to the pick up microphone and the audio output source,
   wherein the sound reduction controller is configured to operate the number of actuators of the audio output source to actuate the diaphragm to output controlled sound in response to incoming audio waves detected by the microphone, to control sound at least in vicinity of the illuminated area associated with the incoming audio waves; and
   wherein the number of actuators is determined based on a target audio frequency range, and each actuator among the number of actuators is positioned with respect to another actuator among the number of actuators based on the target audio frequency range.

2. The system of claim 1, wherein:
   the circuitry is configured to generate an output signal so as to operate the audio output source to output controlled sound waves directly proportional to amplitude of a waveform of a noise associated with the incoming audio waves to create a destructive interference between the incoming audio waves and the output controlled sound, and the destructive interference effectively reduces volume of the incoming audio waves reflected from the illumination output surface of the lighting device.

3. The system of claim 1, wherein the sound reduction controller comprises:
   an audio coder responsive to signals from the pick up microphone to produce digital input signals;
   a digital signal processor coupled to audio coder to:
      receive the digital input signals;
      analyze waveform of a noise associated with the incoming audio waves represented by the digital input signals to generate a digital output signal representing at least one of a phase shifted waveform or an inverted polarity waveform relative to the waveform of the noise; and
   a decoder coupled to the digital signal processor to receive the digital output signal and configured to feed the phase shifted waveform or the inverted polarity waveform to drive the audio output source.

4. The system of claim 3, further comprising an amplifier coupled between the decoder and the audio output source configured to increase amplitude of the phase shifted waveform or the inverted polarity waveform.

5. The system of claim 1, wherein:
   each actuator among the number of actuators is one of a pin actuator, an air actuator, an electrostatic actuator or a piezoelectric transducer.

6. The system of claim 1, wherein the diaphragm includes or is optically coupled to the illumination output surface of the lighting device.

7. The system of claim 1, wherein the diaphragm is at least substantially transparent with respect to the illumination light from the source.

8. The system of claim 1, wherein a specific amount of force is applied to the diaphragm to induce an out of phase relationship between frequency of outgoing audio waves of the controlled output sound from the diaphragm of the audio output source and the frequency of the incoming audio waves.

9. The system of claim 8, wherein the force is based on at least one of thickness of the diaphragm, size of each actuator among the number of actuators, amount of hardness applied by each actuator among the number of actuators on the diaphragm, or strength of air pressure against the diaphragm.

10. The system of claim 1, wherein one actuator among the number of actuators is placed between the lighting device and the diaphragm such that the sound reduction device is configured to operate the one actuator among the number of actuators to actuate the diaphragm.

11. The system of claim 1, wherein the actuators are pin actuators and force is applied to the pin actuators by the circuitry causing pressure to actuate the diaphragm.

12. The system of claim 11, wherein
   the circuitry comprises a programmable logic controller configured to select two actuators among the number of actuators to actuate the diaphragm such that a first actuator among the two actuators actuates the diaphragm prior to the second actuator among the two actuators actuating the diaphragm.

13. The system of claim 1, wherein actuators are air actuators and the system further comprising:
   a micro air compressor configured to release air and
   an air regulating manifold coupled to the micro air compressor to receive the air and transmit the air to drive the air actuators, wherein the air actuators release the air with a force causing pressure to actuate the diaphragm.

14. The system of claim 1, wherein the number of actuators includes at least two actuators coupled to the diaphragm, wherein a first actuator among the at least two actuators is operated by the circuitry to actuate the diaphragm to output the controlled sound wherein the first actuator is on a first frequency and the second actuator is on a second frequency, wherein the second frequency is lower than the first frequency.

15. The system of claim 1, wherein each actuator among the number of actuators is spaced apart a distance from another actuator among the number of actuators, wherein the distance is determined based on the target frequency range.

16. The system of claim 15 wherein the distance is in inverse relationship with the target audio frequency range.

17. The system of claim 1, wherein the circuitry comprises a programmable logic controller configured to select one or more actuators among the number of actuators to actuate the diaphragm to output a controlled sound waveform phase shifted or inverted relative to a waveform of a noise associated with the incoming audio waves.

18. The system of claim 1, wherein the luminaire includes a housing for the lighting device, the sound reduction device is mounted in the housing with the lighting device, and the circuitry is on an exterior of the housing.

19. The system of claim 18, wherein the luminaire includes a frame supported by the housing and a transmissive element having the light output surface held in the housing at least in part by the frame such that the frame receives light from the lighting device and outputs the received light via the light output surface to illuminate the area.

20. The system of claim 19, wherein the light transmissive element is the diaphragm such that the illumination output surface is an audio output surface of the audio output source.

21. The system of claim 1, wherein the circuitry is configured to operate the audio output source to output the controlled sound waves based on a parameter, wherein the parameter is one of a frequency range, phase shift or amplitude.

* * * * *